Feb. 2, 1965 J. MONTEAN, JR 3,167,999
VIBRATION DAMPING MEANS FOR DRIVEN SHAFTS
Filed June 5, 1962 2 Sheets-Sheet 2
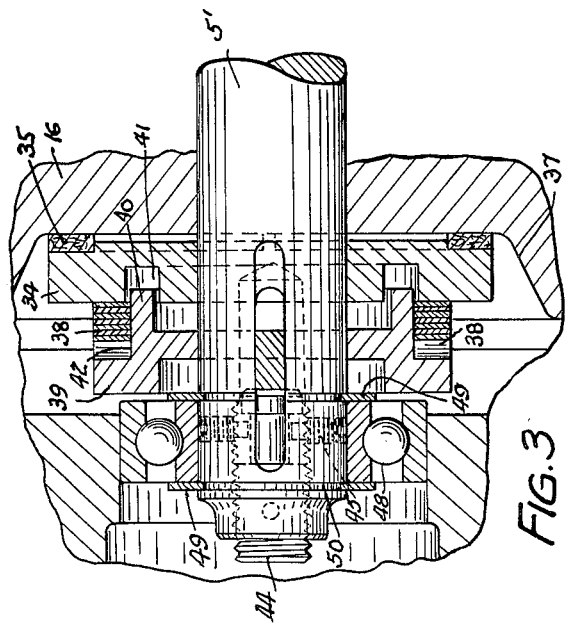
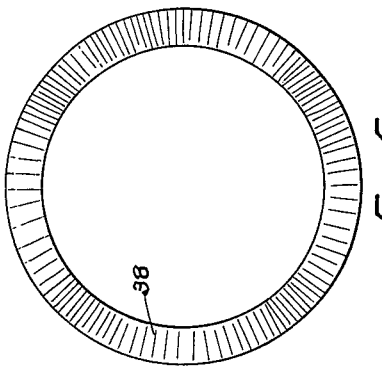
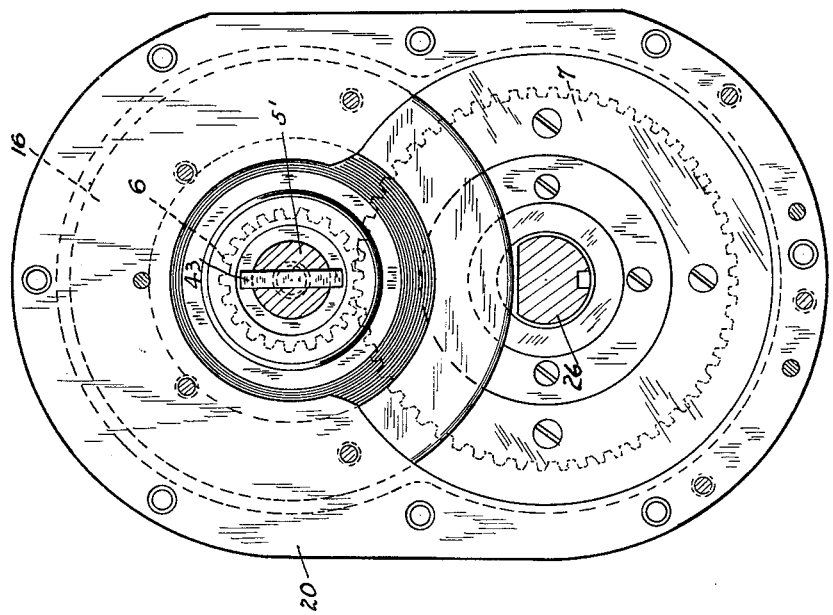
INVENTOR.
John Montean Jr.
BY
ATTORNEY United States Patent Office 3,167,999
Patented Feb. 2, 1965

3,167,999
VIBRATION DAMPING MEANS FOR DRIVEN SHAFTS
John Montean, Jr., North Olmsted, Ohio, assignor to The Lees-Bradner Company, Cleveland, Ohio, a corporation of Ohio
Filed June 5, 1962, Ser. No. 200,189
2 Claims. (Cl. 90—4)

This invention is an improvement in means for minimizing or substantially eliminating torsional vibration frequently occurring in driving mechanisms and relates more particularly to such means which is especially useful for that purpose in connection with machine tools and, by way of example, as used in connection with hob heads employed in single and multiple spindle hobbing machines.

It is recognized that heretofore many forms of flywheel applications have been used for the purpose of reducing vibration. The present invention differentiates therefrom in many respects in that, by its unique construction, it is encased within the housing of the mechanism to which it is attached and is so designed that its efficiency in damping vibration can be adjusted, selected and controlled by means accessible from outside of the mechanism housing. This and other objects of the invention may consist of the following.

One of such objects may reside in the construction of a means for substantially eliminating torsional vibration, which means is enclosed within a mechanism housing and which is operative in a bath of oil thereby supplementing the damping effect of said means upon a driven mechanism.

A further object of the invention is to provide means whereby such a torsional vibration damping device may be adjusted from a point outside the housing of the mechanism to adjust and control its efficiency in damping out vibration.

A further object of the invention consists in the provision of means for damping vibrations set up in a rotating shaft by the impacting of a tool driven thereby to perform an operation on a workpiece without reducing the overall efficiency of the machine to which the device is attached or in which it is a complementary part.

Another object of the invention is to absorb or damp the vibrations set up in a precision metal cutting operation such as hobbing a workpiece wherein such vibrations result from impact of the toothed hob as it rotates in timed cutting relation to a rotating workpiece, and to thus not only retain the high precision of the cutting operation, but to insure long wearing qualities in the bearings supporting the hob shaft or arbor, as well as the gears driving the mechanism.

A still further object of the invention is a device of the kind disclosed which will insure long wear with a minimum of readjustment of the control mechanism unless the demand on the rotating shaft is substantially varied.

Another object of the invention is to provide external means by which easy access is had to adjusting the damping mechanism enclosed within the housing containing other mechanism driven by the shaft on which the damping means is mounted.

Other objects and advantages of this invention will become more apparent as the following description of an embodiment thereof progresses, reference being made to the accompanying drawing in which like reference characters are employed to designate like parts throughout the same.

In the drawings:

FIGURE 2 is an end view taken on line 2—2 of FIGURE 1;

FIGURE 3 is a fragmentary sectional view taken along the plane of the axis of the shaft on which the damping mechanism is mounted and illustrates a form of means employed in adjusting the damping mechanism;

FIGURE 4 is an edge view of one of a plurality of wavy spring washers shown in FIGURE 3 but which is illustrated as not being under the action of compressive forces; and FIGURE 5 is a side view of one of the spring washers shown in FIGURE 3.

Figure 1:
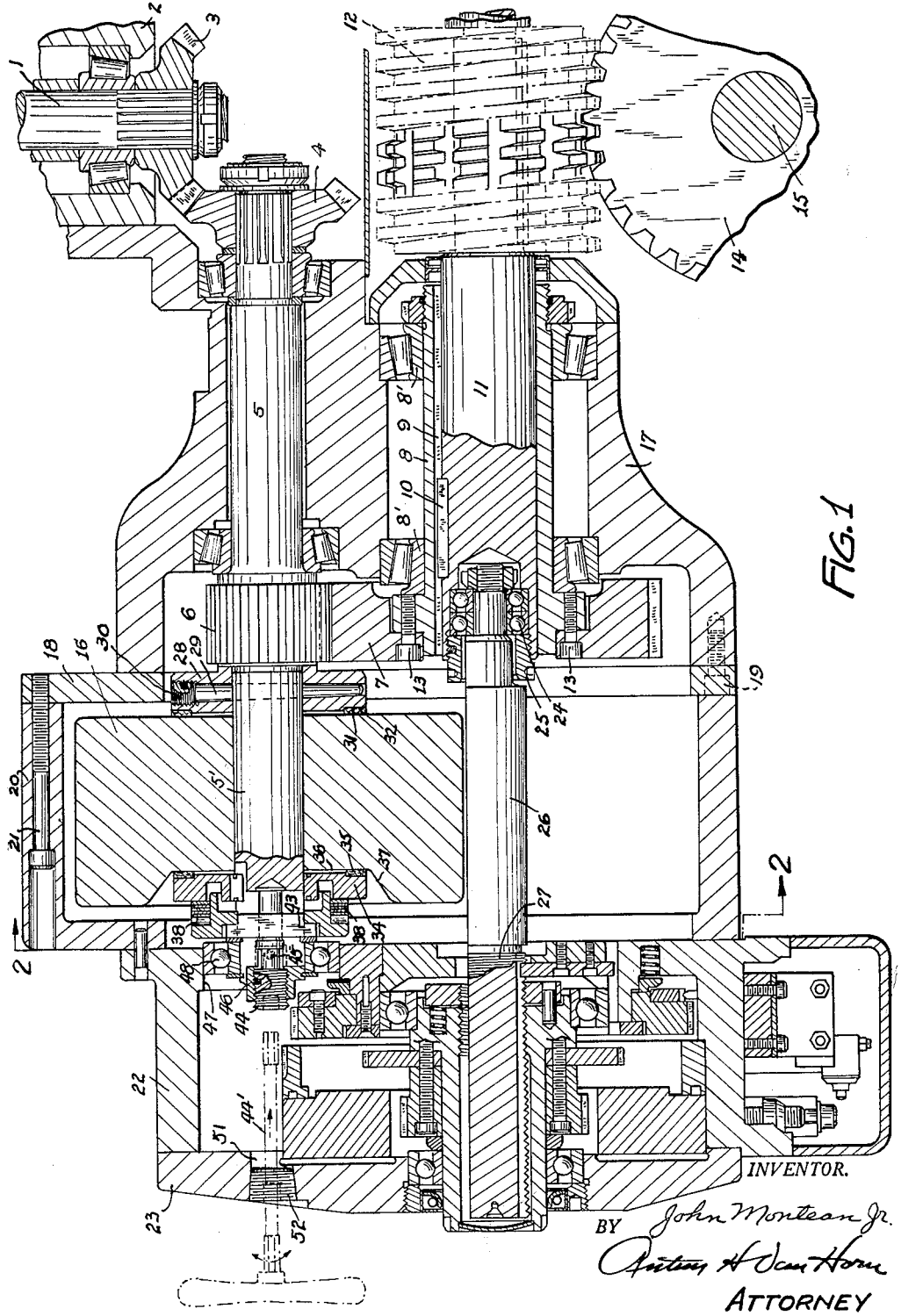
FIGURE 1 is a longitudinal section taken through the axes of two shafts in a machine tool head such as a hob head.

In a hobbing machine, the rather complex gear train which must be resorted to in order to achieve and maintain a precise and exact timed relationship in rotation of the hob, the lead screw and the workpiece, to thus produce a hobbed workpiece characterized as possessing a high degree of accuracy and finish, is subjected to severe and undesirable vibration. As a hob tooth comes up toward, to, through and then erupts out of cutting engagement with the workpiece, the tendency is for the tool and hence the train to try to decelerate as a result of the suddenly applied rapidly increasing torque created by the tooth coming suddenly into cutting engagement with the workpiece and this force will be in a direction tending to cause drive train deceleration. The torque force thus created builds up very rapidly and dies out from its maximum to zero as the cutting edge of the hob's tooth erupts out of the cut. As the tooth starts to erupt out of the cut, the heavily torqued train will now tend to accelerate in response to the removal of the load.

My invention, described and claimed hereinafter, eliminates the disadvantages of conventional flywheel installations wherein the flywheel is splined to the main drive shaft, the pinion shaft or alternatively put on the hob arbor itself. Such installations are recognized in the art as not satisfactory when installed on hobbing machines as distinguished from milling machines or the like where a timed relationship between the work, the tool and the feed is not essential. It is necessary to maintain a precise and exact timed relationship between the rotation of the workpiece, the hob and the feed in order to insure satisfaction and precision in the finished workpiece.

In carrying out one embodiment of my invention as illustrated in the drawings which is shown as part of a hob head assembly, it will be recognized that the invention is especially useful in such metal cutting operations wherein the feed, the rotation of the workpiece and the rotation of the hob must be maintained in exact timed relation and in which a high degree of precision must be maintained.

A drive shaft 1 is mounted in bearings in a housing member 2 and carries on its free end a bevel gear 3 which is in mesh with a bevel gear 4 splined on a driven shaft 5. A spur gear 6 is keyed to rotate with the shaft 5 and is in mesh with a larger gear 7 which it drives. The large gear 7 is attached to and drives a sleeve 8 which is supported in bearings 8' provided with an elongate slot or groove 9 in which a key 10 carried by the shaft 11 is disposed for relative sliding movement between the sleeve and the shaft 11. The shaft 11 which carries a cutting tool such as a hob 12 is rotated through the key connection with the sleeve 8 and the rotating gear 7 to which the sleeve is secured, as at 13. As illustrated in FIGURE 1, the hob functions in the usual way to cut teeth on a workpiece 14 carried on a shaft 15, the workpiece rotating in timed relationship with the hob 12.

Since the cutter 12 is, in this instance, a toothed cutter such as a hob, it causes an impact as each tooth strikes the workpiece 14 during the hobbing operation and these intermittent impact forces tend to set up vibrations along the shaft 11, the sleeve 8, the bearings 8', the gears 7 and 6, and even the shaft 5 and its supporting bearings. It is well recognized that such vibrations, if not damped or absorbed or substantially eliminated, will cause damage to the bearings in which the shafts are mounted and even to the gears driving the mechanism.

The shaft 5 on which the gear 6 is mounted has a portion extending to the left in FIGURE 1 which is indicated at 5' and carries a flywheel 16 which is bored to rotatably fit on the shaft 5'. The hob head housing is indicated at 17 and to its is secured an end plate 18 by means of a series of bolts 19. The flywheel housing is indicated at 20 and is secured to the end plate 18 by means of a plurality of bolts 21, the bolts 19 and 21 being arranged at intervals around the circumference of the mechanism. 22 indicates the hob shifting mechanism housing and 23 indicates a hob shifting housing end plate. The hob arbor or shaft 11 is provided in its inner end portion with a bearing assembly, indicated at 24, and a retainer nut 25 to provide an anti-friction bearing for the axially aligned shaft 26 which is threaded at its left hand end, as at 27, and functions, together with other shifting mechanism within the housing 22, as means for shifting the hob axially. Since the hob shifting mechanism within the housing does not form a part of the present invention and is merely shown for illustrative purposes, it will not be described in detail.

A disk 28 is carried on one end of and rotates with the shaft portion 5' by means of a taper pin 29 fitted in a tapered hole in the disk and passing through an axially aligned transverse hole in the shaft 5' and secured in such position with a locking set screw 30.

A friction ring 31 is bonded to the inner face 32 of the disk and is adapted for frictional contact with the adjacent face of one side of the flywheel 16 rotatably carried on the shaft 5'. Another disk 34 is slidably keyed to the opposite end of and supported on the shaft portion 5' and bonded to this disk is a friction ring 35 having frictional contact with an annular surface 36 constituting part of the opposite side of the flywheel. This surface preferably is recessed as at 37 in the flywheel side wall so that the outer annular face of the disk 34 can be urged to lie within the recess by spring washers 38, such as that illustrated in FIGURES 4 and 5. These washers may consist of annuli having a wavy form as viewed edgewise and when assembled together in a group, as in FIGURE 3, are compressible axially by a back-up ring 39. The back-up ring has an annular flange 40 freely operating axially within an annular groove 41 in the disk 34, the outer peripheral surface 42 of the flange serving as a support carrying the resilient rings or washers 38.

In order that a selected degree of compression may be exerted upon the back-up ring 39, I have provided means for selecting and varying such compressive forces as may be required under various operating conditions.

As illustrated, one form of such means may consist of a cross key 43 acting under pressure of a set screw 44 which is threaded into the adjacent end of the shaft portion 5'. This set screw may be prevented from dislodgment from shaft 5' by a pair of set screw detents 45 and is restrained from turning freely by means of a compressed resilient nylon lock 46. As illustrated, the left hand end of shaft portion 5' is supported in the bore 47 of the housing 22 by the bearing 48 retained on the shaft 5' by circular clips 49 seated in grooves 50 in the end portion of shaft 5'.

Since the entire assembly is housed, access to adjust the set screw 44 by means of a wrench 44' is easily provided by a tapped opening 51 which can be plugged by a threaded plug 52.

The flywheel preferably operates in a bath of oil carried in the housing 20, thus taking advantage of the damping qualities of the hydraulic shear as the flywheel rotates in the oil bath.

During operation where the damping characteristics of the flywheel are not required, the set screw 44 is turned up tight causing the back-up ring 39, the springs 38, disk 34 and friction ring 35 to frictionally contact the flywheel at its one side, thereby to frictionally lock the flywheel between the friction disks 31 and 35, preventing rotation of the flywheel on the shaft portion 5'. Under such conditions, the entire mechanism acts as a solid flywheel.

When it is desired to selectively damp vibrations set up by the toothed cutter rotatingly engaging a rotating workpiece in timed relation, the adjustment may be made by adjusting the screw 44 to compress or relieve compression on the spring washers, thereby increasing or decreasing the frictional grip on the flywheel between the disks, and hence the shaft 5'.

Thus it will be understood that the invention provides means for converting the vibrational energy created by high speed impacts of a toothed cutter with a workpiece into friction between the flywheel and the friction rings on the disks, thereby dissipating the unwanted and undesirable energy.

Various changes may be made in the details of construction and arrangement of parts of the invention without departing from the spirit thereof or the scope of the appended claims.

I claim:

1. In a hobbing machine construction, a housing, a driven rotatable shaft, a second rotatable shaft driven by said first shaft, a toothed cutting tool on said second shaft for performing a cutting operation on a workpiece movable in timed relation with said tool, means for axially shifting said second shaft and tool, means for damping vibrations generated during entry, passing through and eruption of the tool from the cut performed by the tool in the workpiece, said means including a flywheel rotatable on said first shaft, a pair of disks rotatable with said first shaft, one of said disks being both rotatable with said first shaft and slidable axially thereon, a back-up member rotatable with and relatively slidable axially on the said first shaft with respect to said one disk, means comprising resilient annuli concentric to the axis of said first shaft between said member and said one disk, and means for adjusting the axial position of the member with respect to the said one disk whereby to select the force of compression exerted on said resilient annuli and to the flywheel, friction rings fixed on each disk and adapted for frictional contact with the opposed side faces of said flywheel under selected forces of compression, and means disposed axially of said back-up member for exerting selected forces of compression upon said flywheel through said back-up member, said resilient annuli, said disks and the respective friction means carried by said disks.

2. In a hobbing machine construction, a housing, a driven rotatable shaft, a second rotatable shaft driven by said first shaft, a toothed cutting tool on said second shaft for performing a cutting operation on a workpiece movable in timed relation with said tool, means for axially shifting said second shaft and tool, means for damping vibrations generated during entry, passing through and eruption of the tool from the cut performed by the tool in the workpiece, said means including a flywheel rotatable one said first shaft, a pair of disks rotatable with said first shaft, one of said disks being both rotatable with said first shaft and slidable axially thereon, a back-up member rotatable with and relatively slidable axially on the said first shaft with respect to said one disk, means comprising resilient annuli concentric to the axis of said first shaft between said member and said one disk, and means for adjusting the axial position of the member with respect to the said one disk whereby to select the force of compression exerted on said resilient annuli and to the flywheel, friction rings fixed on each disk and adapted for frictional contact with the opposed side faces of said flywheel under selected forces of compression, and means disposed axially of said back-up member for exerting selected forces of compression upon said flywheel through said back-up member, said resilient annuli, said disks and the respective friction means carried by said disks, said last named means including a screw rotatable in one direction to advance said back-up member and to permit withdrawal of said member when reversely rotated whereby to respectively increase and decrease the respective forces applied through the disks to the flywheel.

References Cited in the file of this patent

UNITED STATES PATENTS

| | | |
|---|---|---|
| 1,743,775 | Hollnagel | Jan. 14, 1930 |
| 2,412,499 | Ernst et al. | Dec. 10, 1946 |
| 2,714,823 | Dall et al. | Aug. 9, 1955 |
| 2,723,572 | Bornzin | Nov. 15, 1955 |
| 2,773,427 | Barish | Dec. 11, 1956 |
| 2,960,189 | Osburn | Nov. 15, 1960 |